United States Patent [19]

Muto

[11] Patent Number: 5,557,419
[45] Date of Patent: Sep. 17, 1996

[54] APPARATUS FOR INTERMITTENTLY RECORDING AND/OR REPRODUCING A TIME-VARYING IMAGE

[75] Inventor: Akira Muto, Sakai, Japan

[73] Assignee: Matsushita Electric Industrial Co., Ltd., Osaka, Japan

[21] Appl. No.: 217,201

[22] Filed: Mar. 23, 1994

[30] Foreign Application Priority Data

Mar. 25, 1993 [JP] Japan .................................. 5-066318

[51] Int. Cl.$^6$ .................................................. H04N 5/937
[52] U.S. Cl. ........................ 358/335; 348/408; 358/342
[58] Field of Search ..................................... 358/310, 335, 358/342; 348/408, 405; H04N 5/937

[56] References Cited

U.S. PATENT DOCUMENTS 5,140,437  8/1992  Yonemitsu ............................... 358/342
5,241,383  8/1993  Chen ....................................... 348/405

FOREIGN PATENT DOCUMENTS

4-318786  11/1992  Japan .

Primary Examiner—Howard W. Britton
Attorney, Agent, or Firm—Ratner & Prestia

[57] ABSTRACT

An apparatus for intermittently recording or reproducing a time-varying image includes a buffer interposed between a compression-encoder unit and a recording processor or between a decoder and a reproducing processor, a buffer controller for monitoring the quantity of effective information stored in the buffer, and a system controller for interrupting and restarting the operation of the recording processor or the reproducing processor according to the quantity of the effective information stored in the buffer. During recording, a plurality of consecutive image frames is separated into a plurality of groups, in each of which the image frames are intraframe or interframe compression-coded to digital image information. The total quantity of compression-coded digital image information is limited to a value smaller than a first predetermined value. The digital image information contained in each group is partitioned in units of a second predetermined value smaller than the first predetermined value. The recording or reproduction is carried out for each unit of information at a rate at which the maximum quantity of the digital image information in one group can be processed on real-time basis.

20 Claims, 4 Drawing Sheets

APPARATUS FOR INTERMITTENTLY RECORDING AND/OR REPRODUCING A TIME-VARYING IMAGE

BACKGROUND OF THE INVENTION

1. Field of the Invention

The present invention relates to a recording and/or reproducing apparatus for recording or reproducing on or from a recording medium digital data, particularly those having a variable length, which have been obtained by compression-coding a time-varying image signal. The present invention also relates to a method of recording or reproducing such digital data on or from the recording medium.

2. Description of Related Art

It has been technically very difficult to record or reproduce an image signal as digital data on or from a recording medium because such an image signal contains a great deal of information. By way of example, in applications where an NTSC composite signal is quantized with eight bits at a sampling frequency of 4 $f_{sc}$ ($f_{sc}$ being indicative of the color sub-carrier frequency), real-time recording or reproduction of a time-varying image signal as digital data requires a transfer rate of about 120 Mbps. However, the realization of a recording and/or reproducing system achieving the transfer rate of 120 Mbps depends upon the performance between the recording medium and a recording and/or reproducing head, and is, therefore, technically very difficult. Where information is recorded on or reproduced from the recording medium at a high transfer rate, the use of a plurality of recording and/or reproducing heads is effective in reducing the transfer rate imposed upon each of them, or synchronized operation of a plurality of recording and/or reproducing apparatus is also effective.

Although real-time processing can be achieved in the above-described manner, recording or reproduction of all the time-varying image signal information itself is disadvantageous in that the recording or reproducing period of time required is completely determined by the total capacity of the recording medium. To overcome this problem, some apparatus for recording or reproducing a digitalized time-varying image signal are of a design capable of compression-coding the image signal, for subsequent recording thereof on the recording medium, to the extent that deterioration of information of an original signal does not become conspicuous, and of decoding the compression-coded image signal for reproduction, thereby simplifying the real-time recording or reproduction processing and extending the recording or reproducing period of time.

In compression-coding the image signal, several frames of data are processed as one group, and intraframe compression-coding having a relatively low compression rate is applied to at least one frame of data, while interframe compression-coding having a relatively high compression rate is applied to the remaining frames of data. Although the intraframe compression-coding and decoding are carried out within a single frame, if the compression rate is too high, the SN ratio of the image is considerably reduced. On the other hand, the interframe compression-coding and decoding cannot be carried out within a single frame. However, because the interframe compression-coding makes use of correlation with time among frames, it is possible to make the compression rate relatively high. The combination of the intraframe and interframe compression-coding processings not only offers an increase in total compression rate, but prevents the time-varying image having a violent motion from being reduced in SN ratio.

Where recording or reproduction of the compression-coded data on or from the recording medium is desired, the conventional practice is that the intraframe compression-coded data and the interframe compression-coded data are arrayed in time sequence for each frame, and that the recording or reproduction is carried out by the use of a single recording and/or reproducing head.

In the compression-coding method referred to above, however, the quantity of coded data generally considerably varies depending upon differences in the degree of correlation of the input image signal among the frames or the degree of complexity of individual image frames, thus occasionally greatly changing the data transfer rate.

Conventionally, the information transfer rate between the recording medium and the recording and/or reproducing head depends greatly upon the performance of the recording medium or the like. Accordingly, where the compression rate of the coded data is low, i.e., where the compressed data still have a lot of information, a high information transfer rate is required between the recording medium and the recording and/or reproducing head, making it difficult to achieve the real-time data recording or reproduction. Furthermore, it has hitherto been very difficult to record or reproduce data having a variable length while the transfer rate between the recording medium and the recording and/or reproducing head is being changed momentarily.

SUMMARY OF THE INVENTION

The present invention has been developed to overcome the above-described disadvantages, and an objective of the present invention is to provide an apparatus for intermittently recording and/or reproducing coded data, obtained by variable-length compression-coding a time-varying image signal, at a fixed transfer rate.

In accomplishing the above and other objectives, the recording apparatus according to the present invention comprises a compression-coding means for compression-coding a group of a plurality of consecutive image frames to a group of digital image information. At least one of the consecutive image frames is compression-coded by intraframe compression-coding, while the remaining consecutive image frames are compression-coded, by interframe compression-coding. The compression-coding means is operable to limit the total quantity of the group of compression-coded information to a value not greater than a first fixed value.

The recording apparatus also comprises a storage means for temporarily storing therein the compression-coded information, a monitoring means for monitoring the quantity of effective information stored in the storage means, and a processing means for reading out the information from the storage means for each unit of information of a second fixed value smaller than the first fixed value. The processing means processes the read information at a predetermined rate at which the quantity of information of the first fixed value can be processed on real-time basis. The recording apparatus further comprises a control means for controlling the processing means and outputting an operation start command to the processing means when the quantity of the effective information stored in the storage means is greater than a first given value. The control means also outputs an opera%ion interruption command to the processing means when the quantity of the effective information stored in the storage means is smaller than a second given value.

In another aspect of the present invention, the recording apparatus comprises a compression-coding means of the above-described type, an arbitrary information generating means for generating arbitrary information, and a storage means for temporarily storing therein the compression-coded information and the arbitrary information generated by the arbitrary information generating means. The storage means is controlled by a first control means so that the group of compression-coded information may be partitioned into plural units of information each having a second fixed value smaller than the first fixed value. The first control means adds the arbitrary information generated by the arbitrary information generating means to the last unit of information, when the last unit of information is smaller than the second fixed value.

The recording apparatus also comprises a monitoring means for monitoring the quantity of the effective information stored in the storage means, a processing means for processing the information of the first fixed value at a predetermined rate at which the quantity of information of the first fixed value can be processed on real-time basis, and a second control means for controlling the processing means and outputting an operation start command to the processing means, when The quantity of The effective information stored in the storage means is greater than a first given value. The second control means also outputs an operation interruption command to the processing means, when the quantity of the effective information stored in the storage means is smaller than a second given value.

Preferably, the storage means has a total capacity greater than the quantity of information which can be recorded on at least two tracks of the recording medium.

In this case, the second control means outputs the operation start command, when the total quantity of the compression-coded information and the arbitrary information both stored in the storage means exceeds the quantity of information which can be recorded on at least one track of the recording medium. Furthermore, the second control means outputs the operation interruption command, when the total quantity of the compression-coded information and the arbitrary information both stored in the storage means decreases to a value smaller than the second fixed value.

Advantageously, the recording apparatus further comprises an auxiliary information generating means for generating auxiliary information, and an adding means for adding the auxiliary information generated by the auxiliary information generating means to information read out from the storage means for each unit of information of the second fixed value. The auxiliary information is indicative of the physical position of the recording medium.

In the recording apparatus according to the present invention, a plurality of consecutive image frames are separated into a plurality of groups. At least one of the consecutive image frames in each group is intraframe compression-coded to digital image information, while the remaining consecutive image frames in each group are interframe compression-coded to digital image information. At this time, the total quantity of information contained in each group is limited to a value not greater than the first fixed value. The compression-coded information is temporarily stored in the storage means, and the quantity of effective information stored in the storage means is monitored by the monitoring means.

When the quantity of the effective information stored in the storage means is greater than the first given value, such information is read out therefrom for each unit of information. In contrast, when the quantity of the effective information stored in the storage means is smaller than the second given value, the readout of the information from the storage means is interrupted.

On the other hand, the reproducing apparatus according to the present invention comprises a processing means for processing information at a predetermined rate at which a group containing a maximum of information can be processed on real-time basis, a storage means for temporarily storing therein the information processed by the processing means, and a detection means for detecting the difference between the quantity of information written to the storage means and that read out therefrom. A control means is provided to control the processing means and output a first instruction to interrupt the processing means from outputting the information to the storage means, when the difference detected by the detection means exceeds a first given value. The control means also outputs a second instruction to control the processing means so that the information processed by the processing means is outputted to the storage means, when the difference detected by the detection means becomes smaller than a second given value.

Advantageously, the reproducing apparatus further comprises an information separation means for separating the information processed by the processing means into compression-coded information and arbitrary information, wherein only the compression-coded information is stored in the storage means.

Preferably, the storage means has a total capacity greater than the quantity of information which can be recorded on at least two tracks of the recording medium. In this case, the first given value is so chosen as to be greater than the quantity of information which can be recorded on at least one track of the recording medium. Also, the second given value is so chosen as to be greater than a fixed value indicating the length of each unit of information.

In the reproducing apparatus according to the present invention, the information is processed at a predetermined rate at which a group containing a maximum of information can be processed on real-time basis. The processed information is temporarily stored in the storage means, and the difference between the quantity of information written thereto and that read out therefrom is detected by the detection means.

When the detected difference exceeds the first given value, the information processing is interrupted. In contrast, when the detected difference becomes smaller than the second given value, the information processing is restarted.

During recording or reproduction, the group having a maximum of information is processed on real-time basis.

According to the present invention, because the total quantity of information contained in one group is not greater than the first fixed value, the information transfer rate between the compression-coding means and a recording head can be well balanced with that between an encoding means and a reproducing head by intermittently executing information transmission to the recording head or information reproduction from the reproducing head. For this purpose, one storage means is provided between the compression-coding means and the recording head, while another storage means is provided between the encoding means and the reproducing head.

As a matter of course, continuous recording onto the recording medium at the maximum recording rate will render the associated storage means to become empty of information to be recorded, while continuous reproduction from the recording medium at the maximum reproducing rate will render reproduced information to overflow the associated storage means. According to the present invention, while the quantity of the effective information stored in the storage means is being monitored, the information recording or reproduction is interrupted and restarted according to the quantity of such information.

Accordingly, even if the total quantity of information in one group has a variable length after the compression-coding of a plurality of image frames, the limitation of the maximum length enables the compression-coded time-varying image information to be recorded or reproduced on real-time basis by recording or reproducing the information at the predetermined rate discussed above.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, end wherein.

DETAILED DESCRIPTION OF THE PREFERRED EMBODIMENTS

Figure 1:
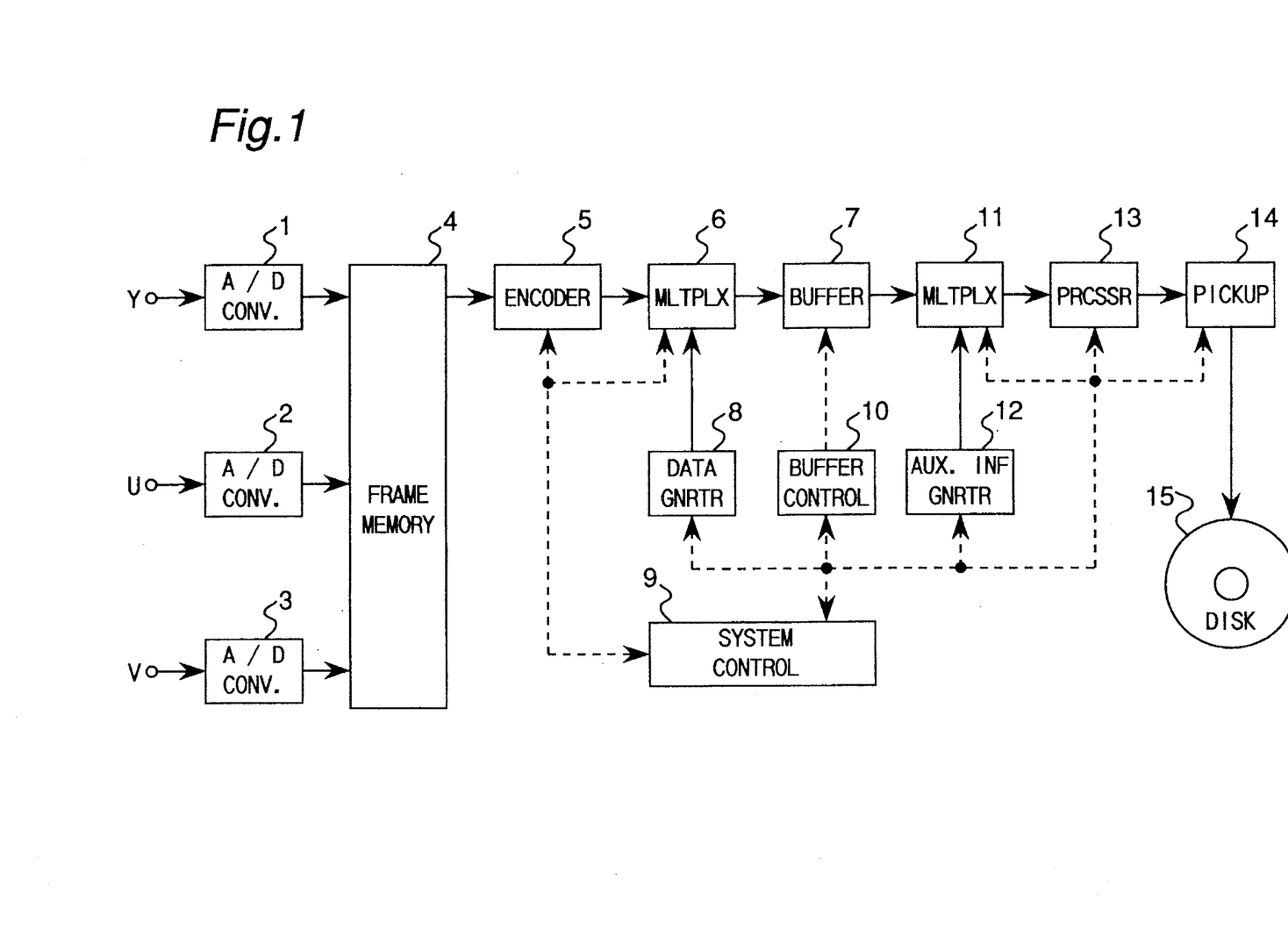
FIG. 1 is a block diagram of a recording apparatus according to a first embodiment of the present invention.

Referring now to the drawings, there is diagrammatically shown in FIG. 1 a recording apparatus embodying the present invention.

The recording apparatus of FIG. 1 comprises three A/D converters 1, 2, and 3 to which analogue video signals Y, U, and V are inputted from outside, respectively. The signal Y is a luminarice signal and is quantized with eight bits by the A/D converter 1 at a sampling frequency of 13.5 MHz, whereas each of the signals U and V is a color signal and is quantized also with eight bits by the A/D converter 2 or 3 at a sampling frequency of 6.75 MHz. The quantized data are all inputted to a frame memory 4 connected with the three A/D converters 1, 2, and 3. At this moment, The quantized data per one second amount to 216 Mb.

Alternatively, digitalized video signals may be directly inputted to the frame memory 4 from outside.

Figure 2:
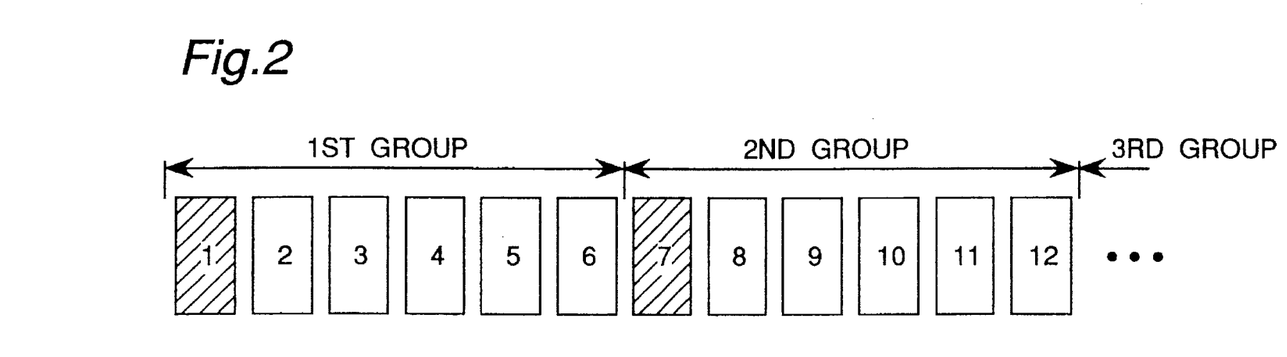
FIG. 2 is a schematic view indicating how image frames are compression-coded in the recording apparatus of FIG. 1.

The digital video signals received by the frame memory 4 are sent to and compression-coded by a compression-encoder unit 5. As shown An FIG. 2, the compression-encoder unit 5 processes six frames of data as one group. The first frame is coded by intraframe compression-coding, whereas the remaining five frames are coded by interframe compression-coding. In FIG. 2, the first to sixth frames are processed as one group, and the same is true for the seventh to twelfth frames. The first and seventh frames indicated by hatching are processed by the intraframe compression-coding, whereas the second to sixth frames and the eighth to twelfth frames are processed by the interframe compression-coding. The compression-encoder unit 5 executes coding so that the quantity of information contained in one group, i.e., six frames does not exceed a predetermined value after the compression-coding.

Figure 3:
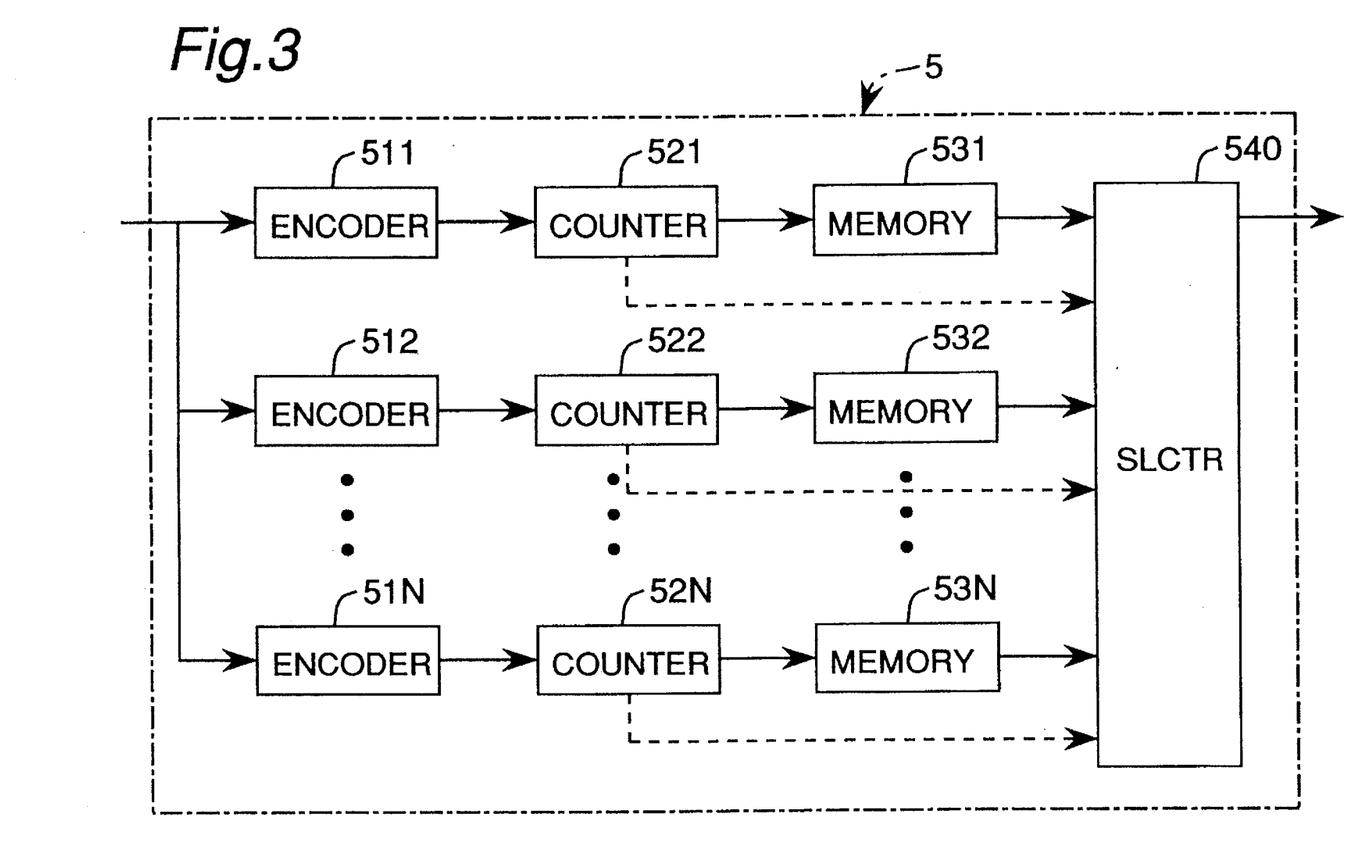
FIG. 3 is a block diagram of a compression-encoder unit provided in the recording apparatus of FIG. 1.

FIG. 3 depicts one example of the internal construction of the compression-encoder unit 5 which limits the quantity of information in each group to the predetermined value or less after the compression-coding.

As shown in FIG. 3, the compression-encoder unit 5 comprises plural sets of compression-encoders 511 to 51N, counters 521 to 52N, and memories 531 to 53N connected in parallel. In each set, the compression-encoder, counter, and memory are connected in series. The compression-encoders 511 to 51N are internally provided with respective quantizers having different widths within which quantization is carried out. Each of the counters 521 to 52N counts the quantity of coded information for each group, while each of the memories 531 to 53N stores the coded information contained in each group. The compression-encoder unit 5 also comprises a selector 540 connected with the memories 531 to 53N. The selector 540 is operable in response to respective count outputs from the counters 521 to 52N to select one of the memories 531 to 53N which should provide the selector 540 with information stored in such one of the memories 531 to 53N. The selector 540 selects an appropriate memory that stores compression-coded information of which the quantity does not exceed the predetermined value but is closest thereto.

The compression-coded data outputted from the compression-encoder unit 5 are sent to a multiplexer 6 and are then written to a transmitting buffer 7 by a buffer controller 10. The buffer controller 10 controls the transmitting buffer 7 so that the compression-coded data in each group may be partitioned into plural units of information each consisting of 2,048 bytes. If the compression-coded data in one group does not become an integral multiple of 2,048 bytes, a system controller 9 controls the multiplexer 6 to add data outputted from an arbitrary-data generator 8 to the last end of the compression-coded data.

Figure 4:
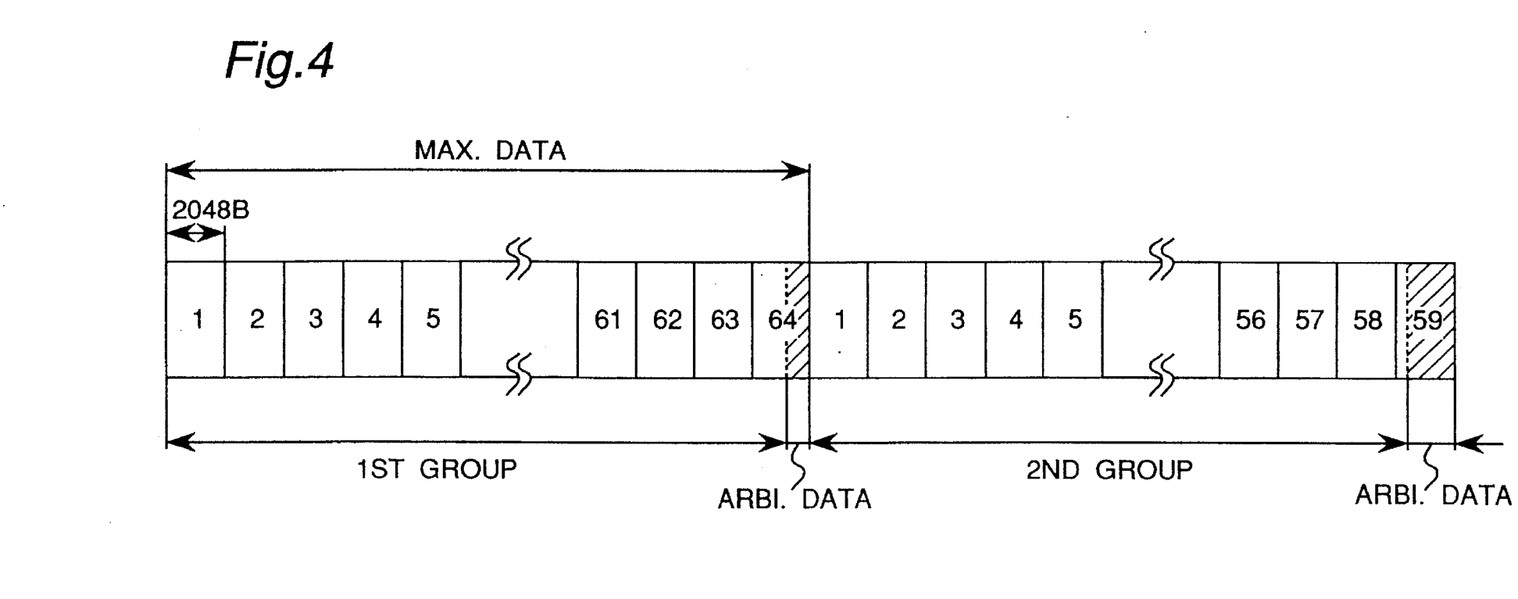
FIG. 4 is a schematic view of twelve consecutive image frames divided into two groups each consisting of plural units of information.

FIG. 4 schematically depicts twelve consecutive image frames, which are divided into two groups each consisting of six image frames. Each of the two groups is coded by variable-length compression-coding and contains arbitrary data added to the last end thereof. The addition of the arbitrary data causes the coded data to consist of an integral multiple of one unit of information of a given length (2,048 bytes).

The total quantity of information in one group has a maximum of 131,072 bytes, and the one group is partitioned into 64 units or less. In FIG. 4, the compression-coded data in the first group consist of 64 units by the addition of the arbitrary data, while those in the second group consist of 59 units by the addition of the arbitrary data. The one unit of information is not necessarily required to be equal to 2,048 bytes.

The buffer controller 10 for monitoring and controlling the quantity of effective data stored in the transmitting buffer 7 informs the system controller 9 of such quantity. In accordance with the quantity of effective data in the transmitting buffer 7, the system controller 9 controls the operation of a multiplexer 11, an auxiliary information generator 12, a recording processor 13, and an optical pickup 14, and also controls the transmission of data from the transmitting buffer 7 via the buffer controller 10.

To this end, the system controller 9 outputs an operation start command to the multiplexer 11, auxiliary information generator 12, recording processor 13, and optical pickup 14, when a quantity of data greater than the quantity of data which can be recorded on one truck of an optical disk 15 has been stored in the transmitting buffer 7. In contrast, when the quantity of data stored in the transmitting buffer 7 has reduced to a value smaller than the quantity of data corresponding to one unit of information, the system controller 9 outputs an operation interruption command to the multiplexer 11, auxiliary information generator 12, recording processor 13, and optical pickup 14.

The data transmission from the transmitting buffer 7 is carried out for each given length of 2,048 bytes. The data from the transmitting buffer 7 are inputted to the recording processor 13 via the multiplexer 1. To the multiplexer 11 are also inputted data from the auxiliary information generator 12 for each given length of 2,048 bytes. The data from the auxiliary information generator 12 are added to the data transmitted from the transmitting buffer 7 prior to the input thereof to the recording processor 13. The auxiliary data are indicative of the physical position on the recording medium, i.e., the optical disc 15, the period of time elapsed from the time when the recording has been started, the number of groups or units, and the like. The multiplexer 11 and the auxiliary information generator 12 are not always required.

In the embodiment shown in FIG. 4, the total quantity of compression-coded data contained in one group of six frames and sent from the compression-encoder unit 5 is, in the case of the first group, equal to sixty-three units and about three fifths. Accordingly, the rest of the $64^{th}$ unit indicated by hatching is filled with arbitrary data sent from the arbitrary-data generator 8, rendering the total quantity of data in the first group to be a fixed value of 131,072 bytes (2,048×64), which is to be recorded on the optical disk 15. Likewise, because the second group contains data corresponding to fifty-eight units and about one fifth, the rest of the $59^{th}$ unit indicated by hatching is filled with arbitrary data sent from the arbitrary-data generator 8, rendering the total quantity of data in the second group to be another fixed value of 20,832 bytes (2,048×59). The arbitrary data may have a specific pattern of information added to the head end thereof. By so doing, during reproduction, the compression-coded information and the arbitrary information can be divided from each other by searching such pattern. Alternatively, the use of information that eliminates the possibility of faulty operation during compression-coding for the arbitrary information allows all the information contained in each group to be transmitted to the compression-encoder unit 5 without dividing the compression-coded information and the arbitrary information from each other and without causing any problem.

The data, divided into units and added with the auxiliary information, are further added with a synchronizing signal, a coding parity for error correction and the like, and are digitally modulated in the recording processor 13 (in the case of an audio compact disk, for example, the EFM (eight-to-fourteen modulation)). Thereafter, the digitalized data are sent to the optical pickup 14. At this moment, the transfer rate of the data to the optical pickup 14 is constant regardless of the quantity of information coded by the compression-encoder unit 5. Then, a laser beam is intensity-modulated according to the data sent to the optical pickup 14 to record the digital data on the optical disk 15.

If one group is made up of six frames and has a maximum of 64 sectors, as shown in FIGS. 2 and 4, and if 30 frames should be processed within one second, the recording processor 13 is required to have a processing rate greater than a value given by:

2,048 (bytes)×64×30/6=655,360 bytes/sec.

It is to be noted that in the embodiment discussed above although information recording is carried out by the intensity-modulation of the laser beam, the intensity of a magnetic field may be modulated with the intensity of the laser beam maintained constant, as is the case with an magnetooptical disk.

It is also to be noted that the quantity of information in each group is not necessarily required to be an integral multiple of 2,048 bytes with no arbitrary information added.

Figure 5:
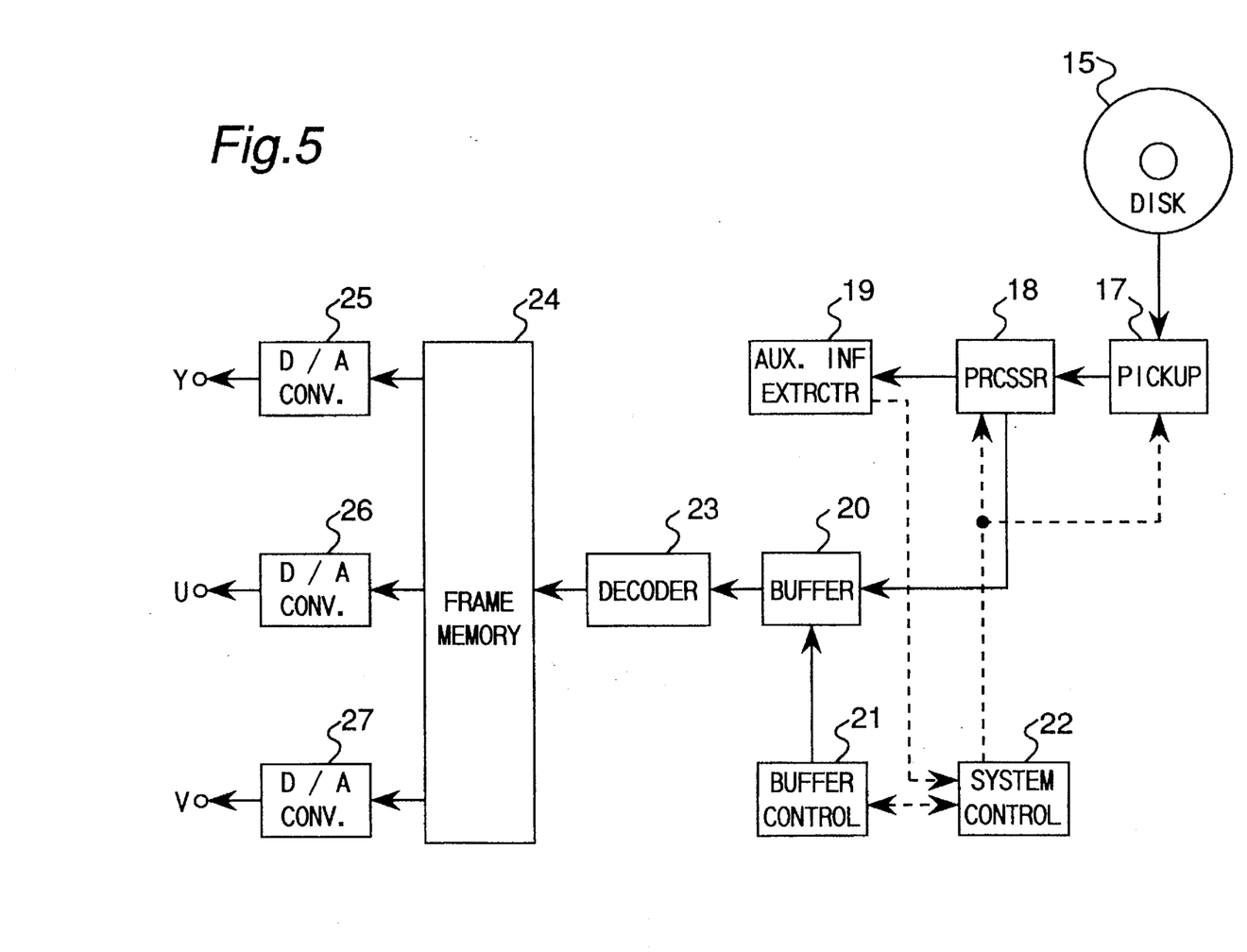
FIG. 5 is a block diagram of a reproducing apparatus according to a second embodiment of the present invention.

FIG. 5 diagrammatically depicts a reproducing apparatus according to a second embodiment of the present invention.

In the reproducing apparatus of FIG. 5, a signal reproduced from the optical disk 15 by an optical pickup 17 is inputted to a reproducing processor 18, which converts the input signal into a binary form, digitally decodes or correct errors. Data decoded by the reproducing processor 18 are sent to an auxiliary information extractor 19 and to a receiving buffer 20. Auxiliary information tracted by the auxiliary information extractor 19 is sent to a system controller 22, which controls a buffer controller 21 in accordance with the extracted information to temporarily store the compression-coded data in the receiving buffer 20. In applications where there is a possibility of faulty operation if the arbitrary data added by the multiplexer 6 during recording are sent to an decoder the arbitrary data are removed by the reproducing processor 18, while only the compression-coded data are sent to and temporarily stored in the receiving buffer 20.

Having received a READ request from the decoder 23, the system controller 22 gives a READ instruction to the buffer controller 21 so that the data stored in the receiving buffer 20 may be read out therefrom. The decoder 23 executes decoding processing based upon the read data.

The data processing rate during reproduction is not smaller than the maximum data transfer rate during recording. The buffer controller 21 monitors the quantity of data stored in the receiving buffer 20, i.e., the difference between the quantity of data written thereto and the quantity of data read out therefrom, and informs the system controller 22 of such information.

When the quantity of data stored in the receiving buffer 20 exceeds a given value, the system controller 22 controls the optical pickup 17 and the reproducing processor 18 to temporarily interrupt readout of the information stored in the optical disk 15. As a result of such temporary interruption, when the quantity of data in the receiving buffer 20 becomes smaller than another given value, the system controller 22 controls the optical pickup 17 and the reproducing processor 18 to restart readout of the information from the optical disk 15.

More specifically, before the free space in the receiving buffer 20 reduces to at least 2,048 bytes or, alternatively, when the receiving buffer 20 has no more than a specific empty space to receive 2,048 bytes of data which the reproducing processor 18 is now processing, the system controller 22 controls the optical pickup 17 to jump one truck back on the optical disk 15, to thereby temporarily interrupt the readout of the information spirally successively recorded on the optical disk 15. The operation of the reproducing processor 18 is also interrupted after the 2,048 bytes of data being now processed thereby have been written to the receiving buffer 20. Thereafter, when the optical pickup 17 has returned to the position where the track jump has taken place, the reproducing operation is restarted to make the read information continuous. As a matter of course, the operation of the reproducing processor 18 is also restarted. The timing to restart the operation is before the quantity of data stored in the receiving buffer 20 becomes smaller than a quantity corresponding to one track of the optical disk 15. In other words, at least one rotation of the optical disk 15 is required until the optical pickup 17 returns to the position where the reproduction has been interrupted.

Because the data transmission is interrupted during a period of time corresponding to one rotation of the optical disk 15, the receiving buffer 19 is required to have a total capacity corresponding to at least one track of the optical disk 15. However, if serious consideration is given to a lag in the timing of interrupting the readout of the information or a time lag before the optical pickup 17 is operated, the data capacity corresponding to one track is practically insufficient, and the receiving buffer 20 must have a data capacity corresponding to at least about two tracks of the optical disk 15.

In the illustrated embodiment, because the receiving buffer 20 has a capacity sufficient to store data recorded on two tracks or more of the optical disk 15, the receiving buffer 20 does not become empty of the compression-coded data and, hence, the data transmission can be carried out whenever a data request from the decoder 23 is given to the receiving buffer 20. Accordingly, the problem of interrupting the decoding processing does not occur.

The image signal data decoded by the decoder 23 are inputted to a frame memory 24, which in turn outputs signals Y, U, and V to D/A converters 25, 26, and 27, respectively, at a constant transfer rate with the signals Y, U, and V appropriately synchronized. The signals Y, U, and V, having passed through the D/A converters 25, 26, and 27, respectively, are outputted to the outside as analogue image signals. The readout rate is so chosen as to depend upon the sampling frequency used at the time of A/D conversion during recording. Accordingly, the readout of the signal Y is carried out at a frequency of 13.5 MHz, whereas that of the signals U and V is carried out at a frequency of 6.75 MHz. In some cases, the data read out from the frame memory 24 are directly outputted to the outside as digital data.

It is to be noted that although the recording apparatus and the reproducing apparatus have been discussed as being separate apparatus, they may be combined into a recording and/or reproducing apparatus in which some elements including the optical pickup are commonly used during recording and reproduction.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recording apparatus for recording a time-varying image signal on a recording medium comprising:

a compression-coding means for compression-coding a group of a plurality of consecutive image frames, corresponding to a given time (t), to a group of digital image information, at least one of the consecutive image frames being compression-coded by intraframe compression-coding while the remaining consecutive image frames are compression-coded by interframe compression-coding, said compression-coding means operable to limit a total quantity of the group of the compression-coded information to a value not greater than a first fixed value (A);

a storage means for temporarily storing therein a portion of the compression-coded information;

a monitoring means for monitoring the quantity of effective information stored in said storage means;

a processing means for reading out the information from said storage means for each unit of information of a second fixed value smaller than at least half said first fixed value at a predetermined rate greater than A/t, said processing means processing the read information at said predetermined rate; and a control means for controlling said processing means and outputting an operation start command to said processing means when the quantity of the effective information stored in said storage means is greater than a first given value, said control means also outputting an operation interruption command to said processing means when the quantity of the effective information stored in said storage means is smaller than a second given value, wherein said processing means determines start and interruption thereof in response to said operation start command and said operation interruption command.

2. A recording apparatus for recording a time-varying image signal on a recording medium comprising:

a compression-coding means for compression-coding a group of a plurality of consecutive image frames, corresponding to a given time (t), to a group of digital image information, at least one of the consecutive image frames being compression-coded by intraframe compression-coding while the remaining consecutive image frames are compression-coded by interframe compression-coding, said compression-coding means operable to limit a total quantity of the group of the compression-coded information to a value not greater than a first fixed value (A);

an arbitrary information generating means for generating arbitrary information;

a storage means for temporarily storing therein a portion of the compression-coded information and the arbitrary information generated by said arbitrary information generating means;

a first control means for controlling said storage means so that the group of the compression-coded information is partitioned into plural units of information each of a second fixed value smaller than at least half said first fixed value, said first control means adding the arbitrary information generated by said arbitrary information generating means to a last unit of information when the least unit of information is smaller than the second fixed value;

a monitoring means for monitoring the quantity of effective information stored in said storage means;

a processing means for reading out the information from said storage means for each unit of information of the second fixed value at a predetermined rate greater than A/t, said processing means processing the information at said predetermined rate; and a second control means for controlling said processing means and outputting an operation start command to said processing means when the quantity of the effective information stored in said storage means is greater than a first given value, said second control means also outputting an operation interruption command to said processing means when the quantity or the effective information stored in said storage means is smaller than a second given value, wherein said processing means determines start and interruption thereof in response to said operation start command and said operation interruption command.

3. The recording apparatus according to claim 2, further comprising an auxiliary information generating means for generating auxiliary information, and an adding means for adding the auxiliary information generated by said auxiliary information generating means to information read out from said storage means for each unit of information of said second fixed value.

4. The recording apparatus according to claim 3, wherein said auxiliary information is indicative of a physical position of said recording medium.

5. The recording apparatus according to claim 2, wherein said storage means has a total capacity greater than the quantity of information which can be recorded on at least two tracks of said recording medium.

6. The recording apparatus according to claim 5, wherein said second control means outputs the operation start command when the total quantity of the compression-coded information and the arbitrary information both stored in said storage means exceeds the quantity of information which can be recorded on at least one track of said recording medium.

7. The recording apparatus according to claim 5, wherein said second fixed value is smaller than a value corresponding to one track of the recording medium, and said second control means outputs the operation interruption command when the total quantity of the compression-coded information and the arbitrary information both stored in said storage means decreases to a value smaller than said second fixed value.

8. A reproducing apparatus for reproducing it time-varying image signal from a recording medium on which a group of a plurality of consecutive image frames corresponding to a given time (t) are compression-coded to a group of digital image information, at least one of the consecutive image frames being compression-coded by intraframe compression-coding while the remaining consecutive image frames are compression-coded by interframe compression-coding, said reproducing apparatus comprising:

a processing means for processing information at a predetermined rate at which a group containing a maximum of information (A) can be processed on real-time basis, said predetermined rate being greater than A/t:

a storage means for temporarily storing therein the information processed by said processing means;

a detection means for detecting a difference between a quantity of information written to said storage means and that read out therefrom; and a control means for controlling said processing means and outputting a first instruction to interrupt said processing means for outputting the information to said storage means when the difference detected by said detection means exceeds a first given value, said control means also outputting a second instruction to control said processing means so that the information processed by said processing means is outputted to said storage means when the difference detected by said detection means becomes smaller than a second given value.

9. The reproducing apparatus according to claim 8, further comprising an information separation means for separating the information processed by said processing means into compression-coded information and arbitrary information, wherein only said compression-coded information is stored in said storage means.

10. The reproducing apparatus according to claim 8, wherein the information processed by said processing means includes compression-coded information and auxiliary information, and further comprising an information extracting means for extracting the auxiliary information from the information processed by said processing means, said compression-coded information being selectively stored in said storage means in accordance with the extracted information.

11. The reproducing apparatus according to claim 8, wherein said storage means has a total capacity greater than the quantity of information which can be recorded on at least two tracks of said recording medium.

12. The reproducing apparatus according to claim 11, wherein said first given value is greater than the quantity of information which can be recorded on at least one track of said recording medium.

13. The reproducing apparatus according to claim 11, wherein said processing means processes the information for each unit of information of a fixed value, and wherein said second given value is greater than said fixed value.

14. A method of recording a time-varying image signal on a recording medium comprising the steps of:

separating a plurality of consecutive image frames into a plurality of groups each corresponding to a given time (t);

intraframe compression-coding at least one of the consecutive image frames in each group to digital image information;

interframe compression-coding the remaining consecutive image frames in said each group to digital image information;

limiting the total quantity of information contained in said each group to a value not greater than a first fixed value (A);

temporarily storing a portion of the compression-coded information in a storage means;

monitoring the quantity of effective information stored in said storage means;

reading out the information from said storage means for each unit of information of a second fixed value smaller than at least half said first fixed value at a predetermined rate greater than A/t, when the quantity of the effective information stored in said storage means is greater than a first given value;

processing the read information at said predetermined rate; and interrupting readout of the information from said storage means, when the quantity of the effective information stored in said storage means is smaller than a second given value.

15. A method of recording a time-varying image signal on a recording medium comprising the steps of:

separating a plurality of consecutive image frames into a plurality of groups each corresponding to a given time (t);

intraframe compression-coding at least one of the consecutive image frames in each group to digital image information;

interframe compression-coding the remaining consecutive image frames in said each group to digital image information;

limiting the total quantity of information contained in said each group to a value not greater than a first fixed value (A);

generating arbitrary information;

temporarily storing a portion of the compression-coded information and the arbitrary information in a storage means;

partitioning each group of compression-coded information into plural units of information each having a second fixed value smaller than at least half said first fixed value;

adding the arbitrary information to a last unit of information when the last unit of information is smaller than the second fixed value;

monitoring the quantity of effective information stored in said storage means;

processing the information of said first fixed value at a predetermined rate greater than A/t, when the quantity of the effective information stored in said storage means is greater than a first given value; and interrupting the information processing when the quantity of the effective data stored in said storage means is smaller than a second given value.

16. The method according to claim 15, wherein the information processing is restarred when the total quantity of the compression-coded information and the arbitrary information both stored in said storage means exceeds the quantity of information which can be recorded on at least one track of said recording medium.

17. The method according to claim 15, wherein the information processing is interrupted when the total quantity of the compression-coded information and the arbitrary information both stored in said storage means decreases to a value smaller than said second fixed value.

18. A method of reproducing a time-varying image signal from a recording medium on which a group of consecutive image frames each corresponding to a given time (t) is compression-coded to a group of digital image information, at least one of the consecutive image frames being compression-coded by intraframe compression-coding while the remaining consecutive image frames are compression-coded by interframe compression-coding, said method comprising the steps of:

a processing information at a predetermined rate at which a group containing a maximum of information (A) can be processed on real-time basis, said predetermined rate being greater than A/t;

temporarily storing the processed information in a storage means;

detecting the difference between the quantity of information written to said storage means and that read out therefrom;

interrupting the information processing when the detected difference exceeds a first given value; and restarting the information processing when the detected difference becomes smaller than a second given value.

19. The method according to claim 18, wherein said first given value is greater than the quantity of information which can be recorded on at least one track of said recording medium.

20. The method according to claim 18, wherein the information is processed for each unit of information of a fixed value, and wherein said second given value is greater than said fixed value.

* * * * *

UNITED STATES PATENT AND TRADE MARK OFFICE
CERTIFICATE OF CORRECTION

PATENT NO.   : 5,557,419
DATED        : September 17, 1996
INVENTOR(S)  : Muto

It is certified that error appears in the above-identified patent and that said Letters Patent is hereby corrected as shown below:

Column 11, line 31, the word "it" should be --a--.

Column 14, line 7, delete the first occurrence of "a".

Signed and Sealed this

Twenty-fifth Day of March, 1997

Attest:

BRUCE LEHMAN

Attesting Officer

Commissioner of Patents and Trademarks